United States Patent
Enam (10) Patent No.: US 12,386,057 B2
(45) Date of Patent: Aug. 12, 2025

(54) CONTINUOUS RADAR CALIBRATION CHECK

(71) Applicant: GM Cruise Holdings LLC, San Francisco, CA (US)

(72) Inventor: Syed Aziz Enam, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 653 days.

(21) Appl. No.: 17/559,884

(22) Filed: Dec. 22, 2021

(65) Prior Publication Data

US 2023/0194697 A1 Jun. 22, 2023

(51) Int. Cl.
*G01S 13/86* (2006.01)
*G01S 7/40* (2006.01)
*G01S 7/497* (2006.01)

(52) U.S. Cl.
CPC .............. *G01S 13/865* (2013.01); *G01S 7/40* (2013.01); *G01S 7/497* (2013.01)

(58) Field of Classification Search
None
See application file for complete search history.

(56) References Cited

U.S. PATENT DOCUMENTS

| | | | |
|---|---|---|---|
| 2021/0096264 A1* | 4/2021 | Bosse | G05D 1/0088 |
| 2021/0201464 A1* | 7/2021 | Tariq | G06V 10/811 |
| 2022/0404460 A1* | 12/2022 | Liu | G01S 17/89 |

* cited by examiner

*Primary Examiner* — Whitney Moore
(74) *Attorney, Agent, or Firm* — Honigman LLP; Matthew H. Szalach; Jonathan P. O'Brien (57) ABSTRACT

Methods and apparatus consistent with the present disclosure may compare position data associated with a Light Detection and Ranging (LiDAR) device and location data associated with a radar device. Changes in relative locations of objects detected along a roadway over time may be used to identify whether sensing capabilities of a sensing apparatus are acceptable. Changes in positions detected by operation of a LiDAR device and locations detected by operation of a radar device may be considered normal or acceptable when those changes are below a threshold value. In instances when changes in relative positions/locations detected by operation the LiDAR device and the radar device at an AV change beyond a threshold value, a sensing system may be considered as being out of calibration. Once a processor detects that a sensing system has changed close to or beyond a threshold level, that processor may initiate a corrective action.

14 Claims, 5 Drawing Sheets

CONTINUOUS RADAR CALIBRATION CHECK

BACKGROUND

1. Technical Field

The present disclosure is generally related to evaluating data from different sensor types. More specifically, the present disclosure is directed to solutions for reducing computational overhead required for tracking objects in an environment, such as in an environment around an autonomous vehicle (AV).

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Solutions consistent with the present disclosure may compare position data associated with a Light Detection and Ranging (LiDAR) device (or LiDAR sensor) and location data associated with a radar device. Changes in relative locations of objects detected over time may be used to identify whether sensing capabilities of a sensing apparatus are acceptable. Changes in positions detected by operation of a LiDAR device and locations detected by operation of a radar device may be considered normal or acceptable when those changes are below a threshold value. In instances when changes in relative positions/locations detected by operation the LiDAR device, and the radar device at an AV change beyond a threshold value, a sensing system may be considered as being out of calibration. Once a processor detects that a sensing system has changed close to or beyond a threshold level, that processor may initiate a corrective action. Such corrective actions may include issuing warning messages, limiting a driving mode of an AV to a mode considered safe, or may result in turning off an automated driving control system at the AV.

Figure 1:
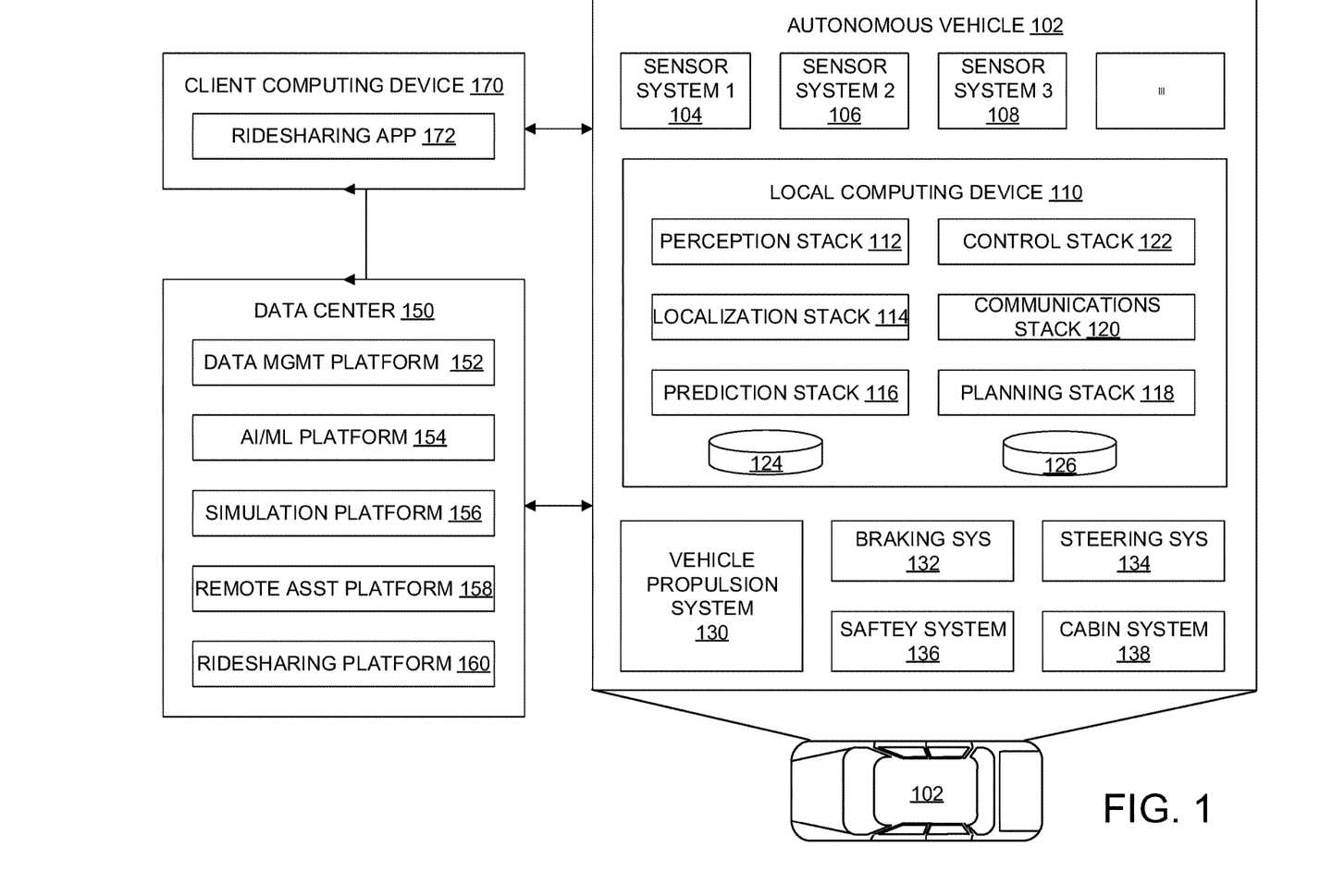
FIG. 1 illustrates an example of a system for managing one or more Autonomous Vehicles (AVs) in accordance with some aspects of the present technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.)

obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Methods of the present disclosure may separate an area around the radar apparatus into a grid pattern that includes a plurality of cells. Objects tracked by one type of sensing apparatus (e.g. a camera and/or LiDAR apparatus) may be associated with particular cells of the grid and a processor that processes radar signal data may only process radar signals associated with the particular cells of the grid.

Figure 2:
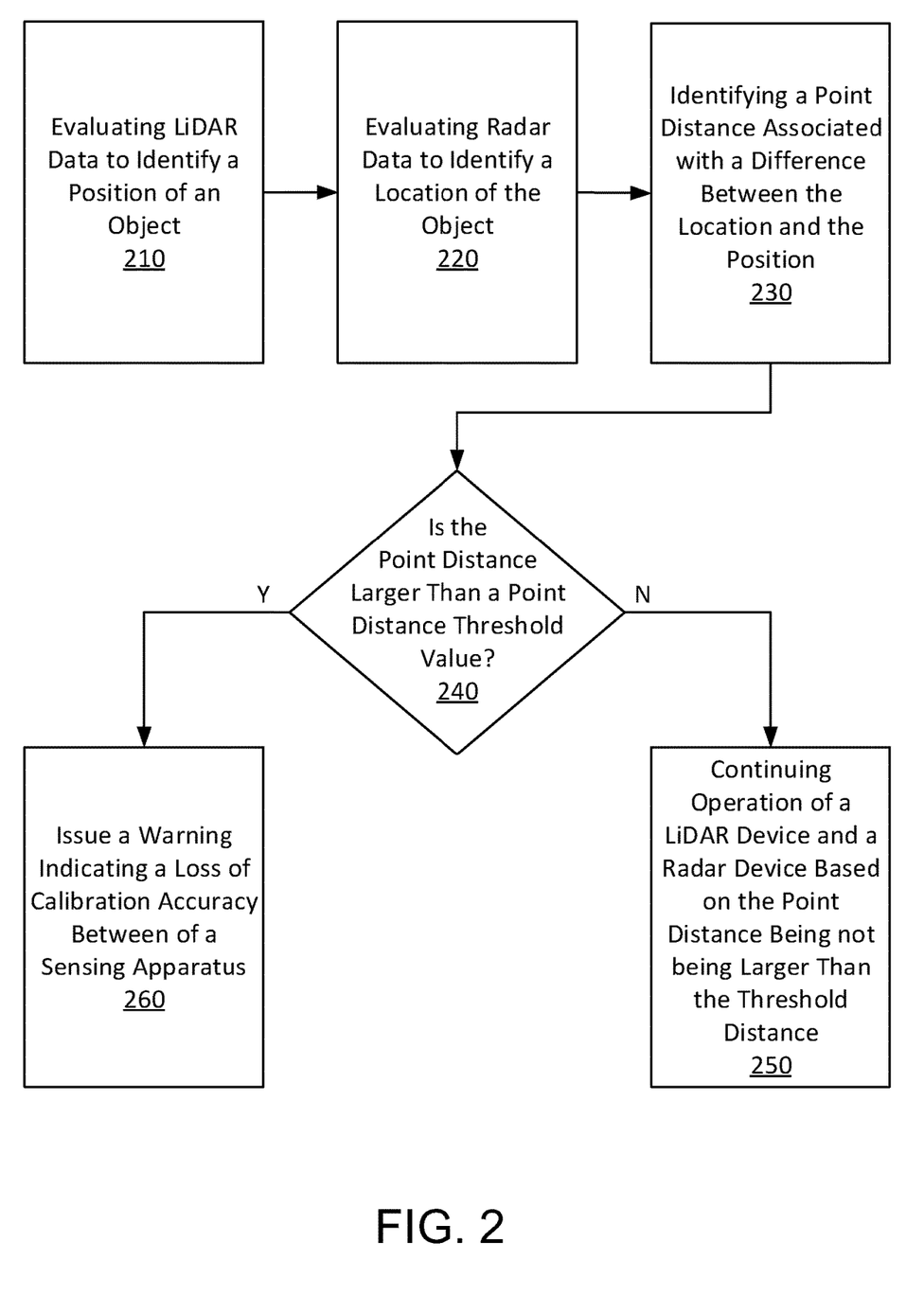
FIG. 2 illustrates a series of steps that may be performed at a sensing apparatus of an automated vehicle (AV).

FIG. 2 illustrates a series of steps that may be performed at a sensing apparatus of an automated vehicle (AV). The various steps of FIG. 2 may be performed by a processor that executes instructions out of a memory at the sensing apparatus. FIG. 2 begins with step 210 where LiDAR data is evaluated to identify a position of an object. This LiDAR data may be evaluated after a LiDAR device transmits a light-based signal, after the light-based signal is reflected off of the object, and after the reflected signal is received/detected by a LiDAR receiving element at the sensing apparatus. Next, in step 220 of FIG. 2 radar data may be evaluated to identify a location of the object. This radar data may be evaluated after an antenna of a radar device transmits a radar signal, after the radar signal is reflected off of the object, and after the radar signal is received by the radar antenna or by a second radar antenna at the sensing apparatus.

Received LiDAR and radar signals may be amplified, filtered, and digitized using a combination of analog and/or digital components. An analog to digital converter (ADC) may be used to convert analog signals into digital data that may be evaluated by a processor executing instructions out of a memory. This processing may include identifying a point distance in step 230 that is associated with the position identified from the LiDAR data and the location identified from the LiDAR sensor. This point distance may be equal to or different from an offset distance that is associated with a distance that separates a place where the LiDAR device is located and a place where the radar device is located at the AV. The distance that separates the LiDAR device and the radar device may correspond to or be equal to the offset distance. This offset distance may be used as part of an initial calibration process of the sensing apparatus. Over time, locations identified from received radar data and positions identified from received LiDAR data may change or drift. This changing or drifting of identified locations and positions may be a function of the aging of components included in the LiDAR or radar device or may be related to other factors. Additionally, or$_{[BR1]}$ alternatively one sensing apparatus may have a rotational offset from each other that a calibration process may account for. For example, a LiDAR sensor and a radar sensor may have a rotational offset from each other of 45 degrees and this rotational offset combined with a linear offset may be accounted for during a calibration process.

In an example, assume that an offset distance for a calibrated sensing system corresponds to a distance of 10 centimeters (cm) along a line that is horizontal to a location where the AV is located. Here, the position identified by operation the LiDAR device may be 10 cm to the right of a location identified by operation of the radar device. As mentioned above, changes in an offset distance may occur as components of a sensing apparatus ages. Changes in distances associated with an object (i.e. changes in offset distance from an original offset distance) identified by processing data from the LiDAR device and the radar device may correspond to a point distance. As long as observed offset distances remain at 10 cm plus or minus a threshold distance, operation of the sensing apparatus may be considered as being adequate to safely continue driving in a particular automated driving mode. If, however, the offset distance increases to or beyond the threshold distance, the sensing apparatus may be considered as being out-of-calibration. Here a point distance may be identified by comparing a current offset distance with an original offset distance.

In an instance when the threshold distance is 12 cm, the sensing apparatus may be considered to be adequately calibrated when the location of the object identified based on operation of the radar device ranges from 22 cm to the left to 2 cm to the right of the position identified based on operation of the LiDAR device. When the location identified based on operation of the radar apparatus indicates that the location of the object is 21 cm to the left of the position of the object identified based on operation of the LiDAR device, and when the original offset distance was 10 cm, the point distance may be calculated by subtracting 10 cm from the 21 cm (21 cm-10 cm). This would result in a point distance of 11 cm in step 230 of FIG. 2.

When the location of the object identified by the radar device has moved to 2 cm to the right of a position of the object identified by the LiDAR device, a point distance may be identified by calculating relative changes in position as compared to an original offset distance. In this example, the relative change (of radar location as compared to LiDAR position) has changed from 10 cm to the left to 2 cm to the right, yielding a total change of 12 cm, exactly at the threshold distance. Such a change could result in the sensing apparatus issuing a warning that the calibration of the sensing apparatus is nearly out of calibration.

After step 230, determination step 240 may identify whether the point distance is larger than a point distance threshold value. When no, program flow may move from step 240 to step 250 where operation of the LiDAR device and the radar device are continued based on the point distance not being larger than the threshold distance. This may include maintaining a current operational mode of the sensing apparatus at the AV.

When determination step 260 identifies that the point distance is larger than the distance value, program flow may move to step 260 of FIG. 2 where a warning may be sent to a person located inside the AV or at a different location. This warning may be provided to the person in the AV, for example, by an audio indication, a visual indication, or both. Alternatively, or additionally, this warning may be sent as an electronic message to a computer of an owner of the vehicle or to a company that maintains operation of the AV.

As mentioned in the example above, the threshold distance may be associated with a magnitude change in an offset from an original offset. This could result in determination step 260 identifying that a sensing system is out of calibration when a location of an object identified based on operation of the radar device is more than 22 cm to the left of a position identified based on operation of the LiDAR device, or when the location of the object is more than 2 cm to the right of the position identified based on operation of the LiDAR device.

Figure 3:
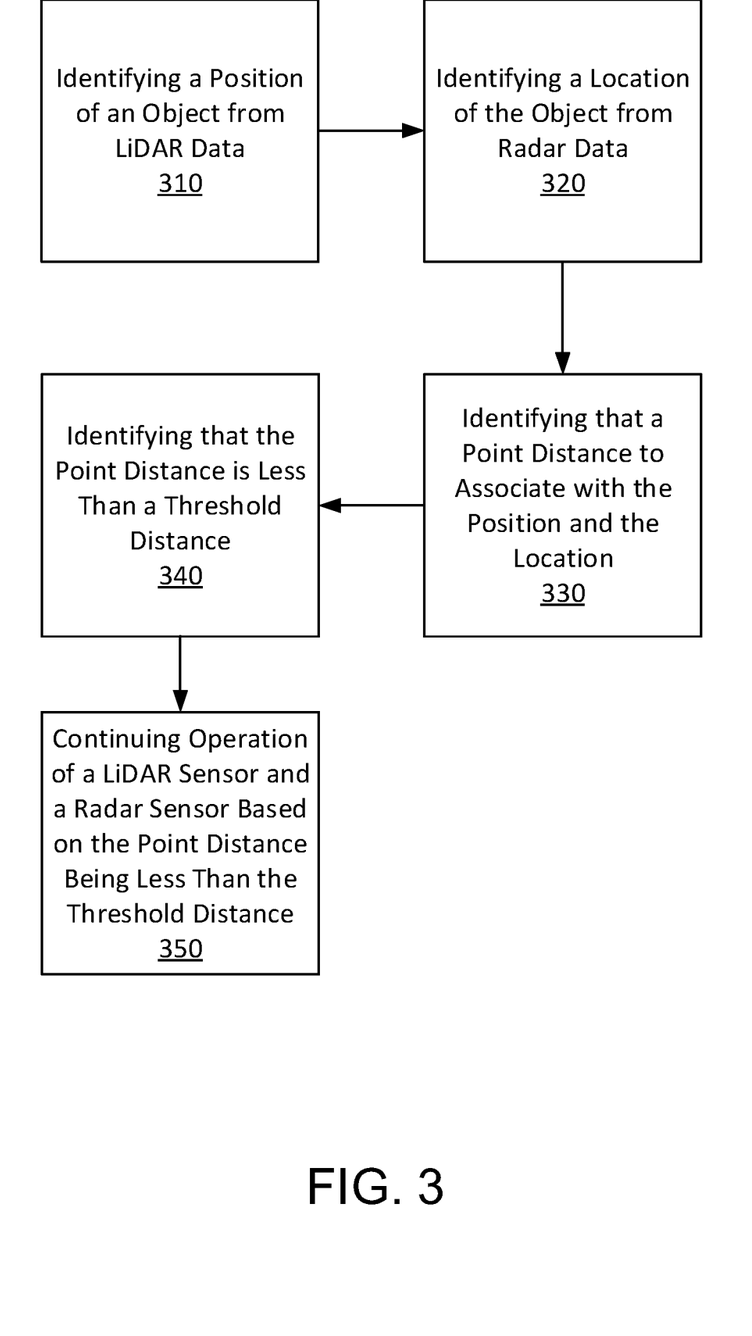
FIG. 3 illustrates a second series of steps that may be performed by a processor executing instructions out of a memory when calibration of the sensing system is checked continuously or periodically.

FIG. 3 illustrates a second series of steps that may be performed by a processor executing instructions out of a memory when calibration of the sensing system is checked continuously or periodically. Here, a position of an object is identified in step 310 from LiDAR data and a location of the object is identified in step 320 from radar data. Next, in step 330 a point distance to associate with the location and the position may be identified and an identification that the point distance is less than a threshold distance may be identified in step 340 of FIG. 3. Operation of a LiDAR sensor and a radar sensor may be continued in step 350 based on the identification that the point distance is less than the threshold distance in step 340.

Figure 4:
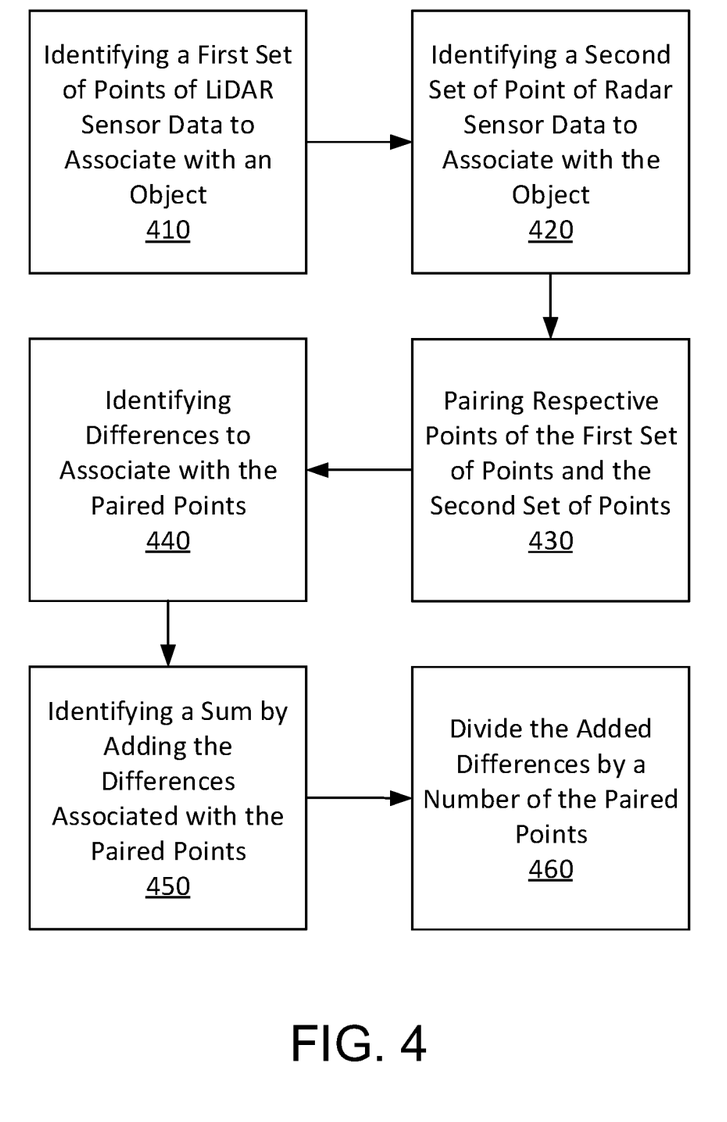
FIG. 4 illustrates a series of steps that may be performed when numerous points of LiDAR data and radar data associated with an object are evaluated to identify the point distance discussed in respect to FIGS. 2 & 3.

FIG. 4 illustrates a series of steps that may be performed when numerous points of LiDAR data and radar data associated with an object are evaluated to identify the point distance discussed in respect to FIGS. 2 & 3. A processor executing instructions out of a memory may identify a set of points (i.e. a first set of points) of LiDAR data to associate with an object in step 410 of FIG. 4. The processor may then execute instructions to identify a set of points (i.e. a second set of points) of radar data to associated with the object in step 420.

Next, respective points of LiDAR data from the first set of points may be paired with respective points of radar data of the second set of points in step 430. This may include identifying points from the first set of points that are closest to points included in the second set of points. Respective points of LiDAR data that are closest to respective points of radar data may be paired. After step 430, differences associated with the paired points may be identified in step 440, each of these respective differences may be added in step 450 of FIG. 4, and then a sum of differences identified in step 450 may be divided by a number of the paired points. In an instance when a set of LiDAR data includes at least five points and a set of radar data includes at least five points, each of the five points of the LiDAR data may be paired with a closest point of the radar data such that the calculations discussed in respect to step 440, 450, and 460 may be performed.

While not shown in FIG. 4, point distances associated with each of the points may be identified such that the differences associated with the paired points may be identified. This may include identifying positions of each respective LiDAR point and locations of each respective radar points. In another example, assume that an initial offset distance of sensed LiDAR data and radar data corresponds to a distance of 10 cm, here a first set of positions of paired LiDAR data points may correspond to positions of 110 cm, 115 cm, 117 cm, 120 cm, and 125 cm and a second set of locations of paired radar data points may correspond to locations of 121 cm, 120 cm, 125 cm, 130 cm, and 140 cm. The sum of the differences of these paired points may be calculated (121−110)+(120−115)+(125−117)+(130−120)+(140−125)=(11+5+8+10+15)=49 cm. Since the number of paired points equal 5, the added differences divided by the number of paired points=49 cm divided by 5=9.8 cm. Since the original offset distance was 10 cm, a point distance associated with this average of distances equals 9.8−10=−0.2 cm. Note that this point distance is well within the 12 cm distance threshold value discussed above.

Figure 5:
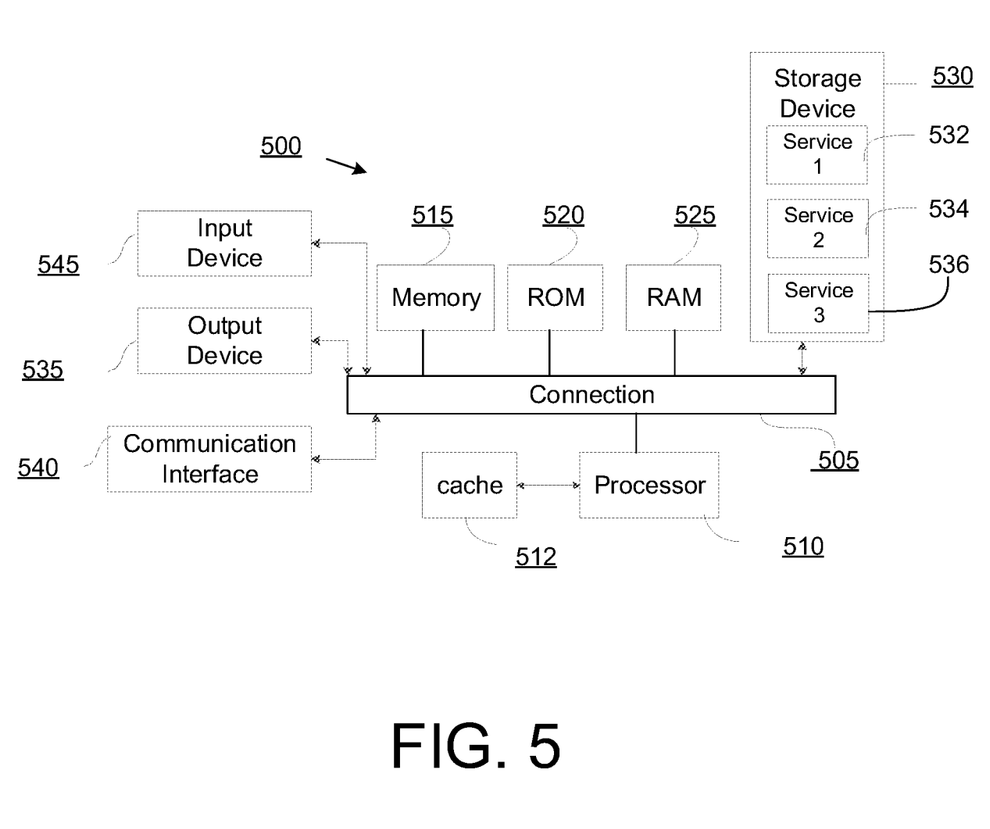
FIG. 5 shows an example of computing system that may be used to implement at least some of the functions reviewed in the present disclosure in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for monitoring a sensing apparatus, the method comprising:
    identifying a position of an object based on data associated with a light detecting and ranging (LiDAR) sensor, wherein LiDAR sensor data corresponds to a current operational mode of the sensing apparatus;
    identifying a location of the object based on data associated with a radar sensor, wherein radar sensor data corresponds to the current operational mode of the sensing apparatus;
    identifying a point distance to associate the position and the location;
    identifying that the point distance is less than a threshold distance based on comparing the position to the location;
    continuing operation of the LiDAR sensor and the radar sensor based on the identification that the point distance is less than the threshold distance;
    receiving LiDAR calibration data based on light reflecting off of a target used to initially calibrate the sensing apparatus;
    receiving radar calibration data based on a radar signal reflecting off the target when the sensing apparatus is initially calibrated;
    associating a first position of the target identified based on an evaluation of the LiDAR calibration data;
    associating a first location of the target identified based on an evaluation of the radar calibration data, wherein the first position and the first location correspond to a distance that the LiDAR sensor is separated from the radar sensor at an automated vehicle (AV); and
    identifying an offset to associate with at least one of the LiDAR calibration data or the radar calibration data.

2. The method of claim 1, further comprising:
    identifying a second position of a second object based on additional data received via the LiDAR sensor;
    identifying a second location of the second object based on additional data associated with the radar sensor;
    identifying a second point distance to associate with the second position and the second location; and
    issuing a warning indicating that the current operational mode of the sensing apparatus should not be maintained based on an identification that the second point distance is not within the threshold distance.

3. The method of claim 1, further comprising:
    identifying a first set of points of the LiDAR sensor data to associate with the object and with a calculation directed to identifying the point distance;
    identifying a second set of points of the radar sensor data to associate with the object and with the calculation directed to identifying the point distance;
    pairing respective points from the first set of points with respective points from the second set of points into a number of paired points;
    identifying differences to associate with each of the respectively paired points; and
    calculating an average by summing the differences associated with each of the respectively paired points and by dividing the sum of the differences by the number of paired points.

4. The method of claim 3, further comprising:
    selecting from the first set of points a number of points of the LiDAR sensor data to pair with the points of the second set of points;
    selecting from the second set of points a number of points of the radar sensor data to pair with the points of the first set of points, wherein the number of points of the LiDAR sensor data are equal to the number of points of the radar sensor data; and performing a calculation to identify the point distance.

5. The method of claim 1, further comprising:
identifying a first distance associated with the position of the object;
identifying a second distance associated with the location of the object;
identifying a difference between the first distance and the second distance; and
subtracting the offset from the difference between the first distance and the second distance when identifying the point distance.

6. A non-transitory computer-readable storage medium having embodied thereon a program executed by a processor to perform a method for monitoring a sensing apparatus, the method comprising:
identifying a position of an object based on data associated with a light detecting and ranging (LiDAR) sensor, wherein LiDAR sensor data corresponds to a current operational mode of the sensing apparatus;
identifying a location of the object based on data associated with a radar sensor, wherein radar sensor data corresponds to the current operational mode of the sensing apparatus;
identifying a point distance to associate the position and the location;
identifying that the point distance is less than a threshold distance based on comparing the position to the location;
continuing operation of the LiDAR sensor and the radar sensor based on the identification that the point distance is less than the threshold distance;
receive LiDAR calibration data based on light reflecting off of a target used to initially calibrate the sensing apparatus;
receive radar calibration data based on a radar signal reflecting off the target when the sensing apparatus is initially calibrated;
associate a first position of the target identified based on an evaluation of the LiDAR calibration data;
associate a first location of the target identified based on an evaluation of the radar calibration data, wherein the first position and the first location correspond to a distance that the LiDAR sensor is separated from the radar sensor at an automated vehicle (AV); and
identify an offset to associate with at least one of the LiDAR calibration data or the radar calibration data.

7. The non-transitory computer-readable storage medium of claim 6, further comprising:
identifying a second position of a second object based on additional data received via the LiDAR sensor;
identifying a second location of the second object based on additional data associated with the radar sensor;
identifying a second point distance to associate with the second position and the second location; and
issuing a warning indicating that the current operational mode of the sensing apparatus should not be maintained based on an identification that the second point distance is not within the threshold distance.

8. The non-transitory computer-readable storage medium of claim 6, the program further executable to:
identify a first set of points of the LiDAR sensor data to associate with the object and with a calculation directed to identifying the point distance;
identify a second set of points of the radar sensor data to associate with the object and with the calculation directed to identifying the point distance;
pair respective points from the first set of points with respective points from the second set of points into a number of paired points;
identify differences to associate with each of the respectively paired points; and
calculate an average by summing the differences associated with each of the respectively paired points and by dividing the sum of the differences by the number of paired points.

9. The non-transitory computer-readable storage medium of claim 8, the program further executable to:
select from the first set of points a number of points of the LiDAR sensor data to pair with the points of the second set of points;
select from the second set of points a number of points of the radar sensor data to pair with the points of the first set of points, wherein the number of points of the LiDAR sensor data are equal to the number of points of the radar sensor data; and
perform a calculation to identify the point distance.

10. The non-transitory computer-readable storage medium of claim 6, the program further executable to:
identify a first distance associated with the position of the object; identify a second distance associated with the location of the object;
identify a difference between the first distance and the second distance; and
subtract the offset from the difference between the first distance and the second distance when identifying the point distance.

11. A sensing apparatus comprising:
a light detecting and ranging (LiDAR) sensor that collects LiDAR sensor data from which a position of an object is identified;
a radar sensor that collects radar sensor data from which a location of the object is identified;
a memory; and
a processor that executes instructions out of the memory to:
identify a point distance to associate the position and the location,
identify that the point distance is less than a threshold distance based on comparing the position to the location;
continue operation of the LiDAR sensor and the radar sensor based on an identification that the point distance is less than the threshold distance;
receive LiDAR calibration data based on light reflecting off of a target used to initially calibrate the sensing apparatus;
receive radar calibration data based on a radar signal reflecting off the target when the sensing apparatus is initially calibrated;
associate a first position of the target identified based on an evaluation of the LiDAR calibration data;
associate a first location of the target identified based on an evaluation of the radar calibration data, wherein the first position and the first location correspond to a distance that the LiDAR sensor is separated from the radar sensor at an automated vehicle (AV); and
identify an offset to associate with at least one of the LiDAR calibration data or the radar calibration data.

12. The sensing apparatus of claim 11, wherein the processor executes the instructions out of the memory to:
- identify a second position of a second object based on additional data received via the LiDAR sensor;
- identify a second location of the second object based on additional data associated with the radar sensor; identify a second point distance to associate with the second position and the second location; and issue a warning indicating that a current mode of the sensing apparatus should not be maintained based on an identification that the second point distance is not within the threshold distance.

13. The sensing apparatus of claim 11, wherein the processor executes the instructions out of the memory to:
- identify a first set of points of the LiDAR sensor data to associate with the object and with a calculation directed to identifying the point distance;
- identify a second set of points of the radar sensor data to associate with the object and with the calculation directed to identifying the point distance;
- pair respective points from the first set of points with respective points from the second set of points into a number of paired points;
- identify differences to associate with each of the respectively paired points; and
- calculate an average by summing the differences associated with each of the respectively paired points and by dividing the sum of the differences by the number of paired points.

14. The sensing apparatus of claim 13, wherein the processor executes the instructions out of the memory to:
- select from the first set of points a number of points of the LiDAR sensor data to pair with the points of the second set of points;
- select from the second set of points a number of points of the radar sensor data to pair with the points of the first set of points, wherein the number of points of the LiDAR sensor data are equal to the number of points of the radar sensor data; and
- perform a calculation to identify the point distance.

* * * * *